United States Patent [19]
Ferrari

[11] Patent Number: 5,761,891
[45] Date of Patent: Jun. 9, 1998

[54] LAWN MOWERS

[75] Inventor: Gianni Ferrari, Luzzara, Italy

[73] Assignee: Gianni Ferrari S.R.L., an Italian Limited Liability, Reggiolo, Italy

[21] Appl. No.: 705,832

[22] Filed: Aug. 30, 1996

[30] Foreign Application Priority Data

Sep. 18, 1995 [IT] Italy ................. RE95A0051

[51] Int. Cl.⁶ ......................................... A01D 34/66
[52] U.S. Cl. ........................... 56/6; 56/17.5; 56/255
[58] Field of Search ................... 56/6, 17.5, 320.1, 56/255, 295, DIG. 17, DIG. 20

[56] References Cited

U.S. PATENT DOCUMENTS

| | | |
|---|---|---|
| 2,017,524 | 10/1935 | Bolens. |
| 3,134,214 | 5/1964 | Shaw. |
| 4,193,249 | 3/1980 | Tackett ................ 56/11.9 |
| 4,364,221 | 12/1982 | Wixom ................ 56/13.6 |
| 4,424,661 | 1/1984 | Kulak ................ 56/320.2 |
| 4,856,265 | 8/1989 | Wolf ................ 56/6 X |
| 5,085,042 | 2/1992 | Lansdowne ................ 56/6 |
| 5,214,906 | 6/1993 | Saki et al. ................ 56/320.2 |
| 5,259,176 | 11/1993 | Kahamura et al. ................ 56/255 |
| 5,321,938 | 6/1994 | La Blanc ................ 56/6 |
| 5,626,007 | 5/1997 | Harrington et al. ................ 56/13.5 |

FOREIGN PATENT DOCUMENTS

0619065  10/1994  European Pat. Off..

*Primary Examiner*—Terry Lee Melius
*Attorney, Agent, or Firm*—Birch, Stewart, Kolasch & Birch, LLP

[57] ABSTRACT

A lawn mower includes a cutting unit having two rotors coupled together within a single casing which rotate in opposite directions. The rotors carry at least two aligned blades. The distance between the axes of the rotors is such that the areas covered by the blades when rotating are partially superposed in correspondence with an axis of symmetry of the pair of rotors which coincides with the mower axis. The direction of rotation of the two rotors is such that the direction of movement of the blades when in proximity to said axis of symmetry is the same as the forward travel direction of the mower.

7 Claims, 10 Drawing Sheets

LAWN MOWERS

BACKGROUND OF THE INVENTION

1. Field of the Invention

This patent relates to self-propelled lawn mowers for parks or gardens, of the type comprising a cutting unit consisting of two rotors coupled together within a single casing to rotate in opposite directions, each rotor carrying at least two equidistant blades.

2. Description of Background Art

The casing of a lawn mower is open and matches the shape of the areas covered by the cutting blades, these being partially superposed in the central region to convey the grass, in the opposite direction to the travel direction, into a suction-evacuation duct which feeds the grass into a collection bin mounted to the rear of the mower.

Mowers of this type have gradually assumed increasing dimensions and working power, with the result that certain operating defects have appeared which it is the purpose of the present invention to overcome.

A first drawback arises from the fact that the cut grass, which is generally moist and sticky, tends to adhere to the walls of the casing to form groups which, besides hindering proper mower operation, become suddenly detached on account of their own weight when they reach a certain size, and fall onto the ground without being drawn in and conveyed to the collection bin.

The groups of cut grass form both at the mouth of the evacuation duct leading to the bin, and on the upper part of the casing enclosing the blades.

The blades of the lawn mower are shaped as the blades of a propeller generating an upwardly directed air stream, and although on the one hand this design favors the straightening of the stalks to facilitate their cutting, on the other hand it propels the grass towards the upper surface of the casing, causing it to undesirably accumulate.

The presence of the groups of grass also hinders correct intake of the grass gradually cut off, causing the groups of grass to deposit irregularly on the ground.

In addition, the direction of rotation of the blades concentrates the grass flow between the two rotors, which further aggravates the aforesaid problems.

Furthermore, the aforesaid problems are even more apparent if operating on grass of a certain height, because the product volume increases.

Again, in the case of tall grass, the front edge of the casing enclosing the blades, and which is lower than the tall grass, bends forward the grass to be cut, so that stalks of the tall grass escape the action of the rotary blades, especially in the central region of the mower, resulting in irregularly cut grass.

SUMMARY OF THE INVENTION

The invention overcomes the aforesaid drawbacks by firstly reversing the direction of rotation of the blades, so that within their region of partial superposing the blades move in the same direction as the forward travel direction of the mower.

The effect of this blade rotation reversal has proved surprising.

The mass of cut grass is conveyed to the outside of the two rotors in correspondence with the lateral regions of the casing, and escapes tangentially to prevent formation of the unwanted accumulations in the central region in correspondence with the evacuation duct.

Formation of cut grass accumulations on the upper wall of the casing is also prevented, according to the invention, by providing a counter-blade overlying and spaced from each blade, to halt the upward flow of the cut grass and to discharge it by centrifugal force.

Finally, according to the invention, the central front region of the blade-enclosing casing is provided with a small swinging flap which rises automatically when particularly tall grass is to be cut.

In this manner the grass lying between the rotor axes is not bent.

According to a preferred embodiment of the invention, to the mouth of the evacuation duct there is applied a bladed impeller which facilitates the conveying of the grass into the duct.

The impeller axis is preferably horizontal, perpendicular to the travel direction, the impeller blades being radial.

Besides facilitating the flow of cut grass into the evacuation duct, the presence of the impeller enables the longitudinal dimensions of the mower to be reduced in that it enables the blade-containing casing to be shaped with its rear edge practically perpendicular to the travel direction.

The merits and operational and constructional characteristics of the invention will be apparent from the detailed description given hereinafter with reference to the figures of the accompanying drawings, which show a preferred embodiment thereof by way of a non-limiting example.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The figures show the lawn mower 1, which comprises a main frame 2 provided with two independent drive wheels 3 and two rear swivel wheels 4, of which only one is visible.

On the frame 2 there are provided a hydraulic power unit 5 operated by an internal combustion engine, a tiltable collection bin 6 and a driving seat 7 with the respective controls, all in a well-known usual form so that more detailed description is not required.

In front of the drive wheels 3 there is hinged a secondary frame supporting the cutting unit 9.

The secondary frame can be raised into the rest position and lowered into the working position, and comprises two parallel arms 10 provided at their ends with two swivel wheels 11.

The arms 10 each comprise two holes 12 for receiving two vertical pins 13 extending from the top of a casing 14.

The pins 13 (FIGS. 3, 4) are provided with holes 15 which enable the casing 14 to be fixed to the arms 10 at the desired working height.

To facilitate its positioning the casing 14 is provided with upper handles 16.

The casing 14 is positioned symmetrically about the mower axis, and supports two rotors 17 (FIGS. 3, 6), each provided with two aligned blades 18.

Figure 1:
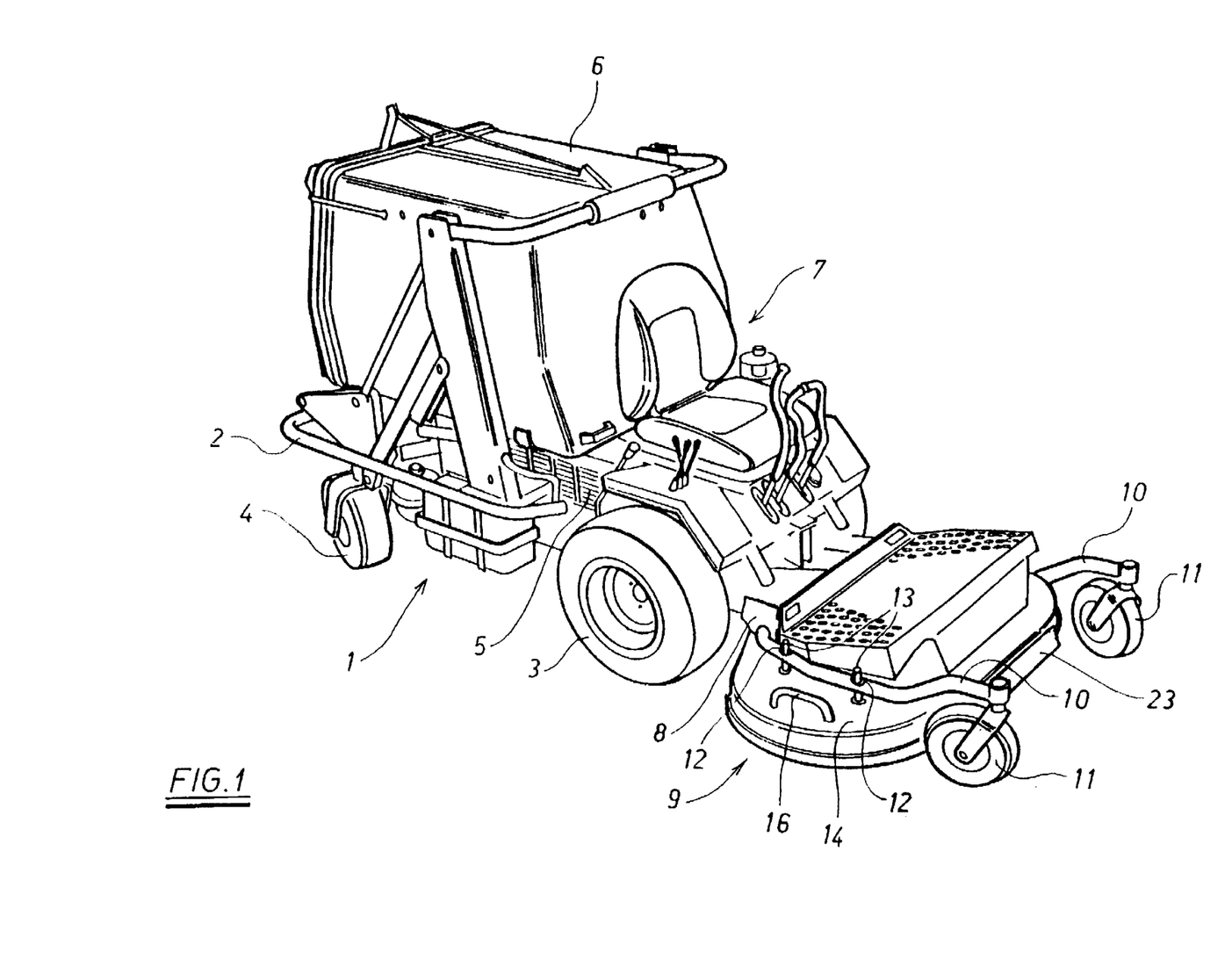
FIG. 1 is a schematic perspective view of an improved lawn mower according to the invention.
Figure 2:
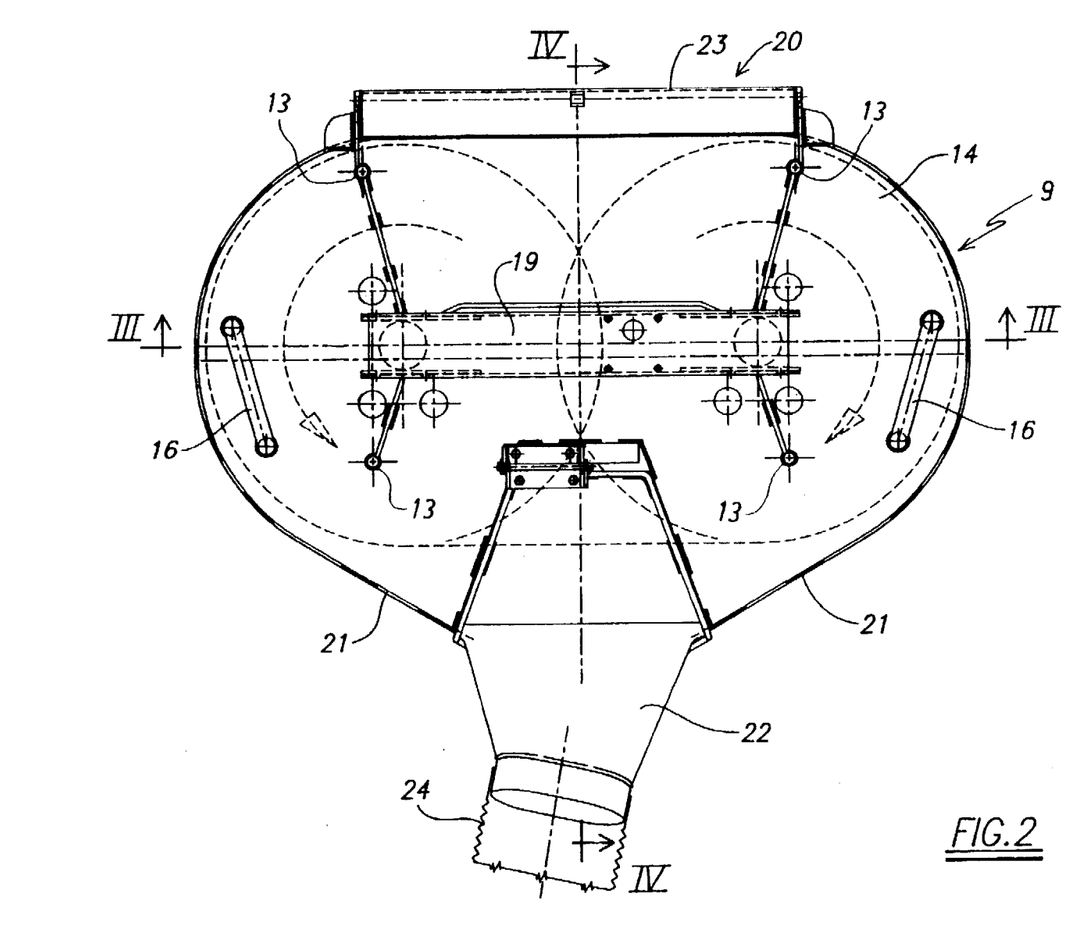
FIG. 2 is a view of the cutting unit taken from above.
Figure 3:
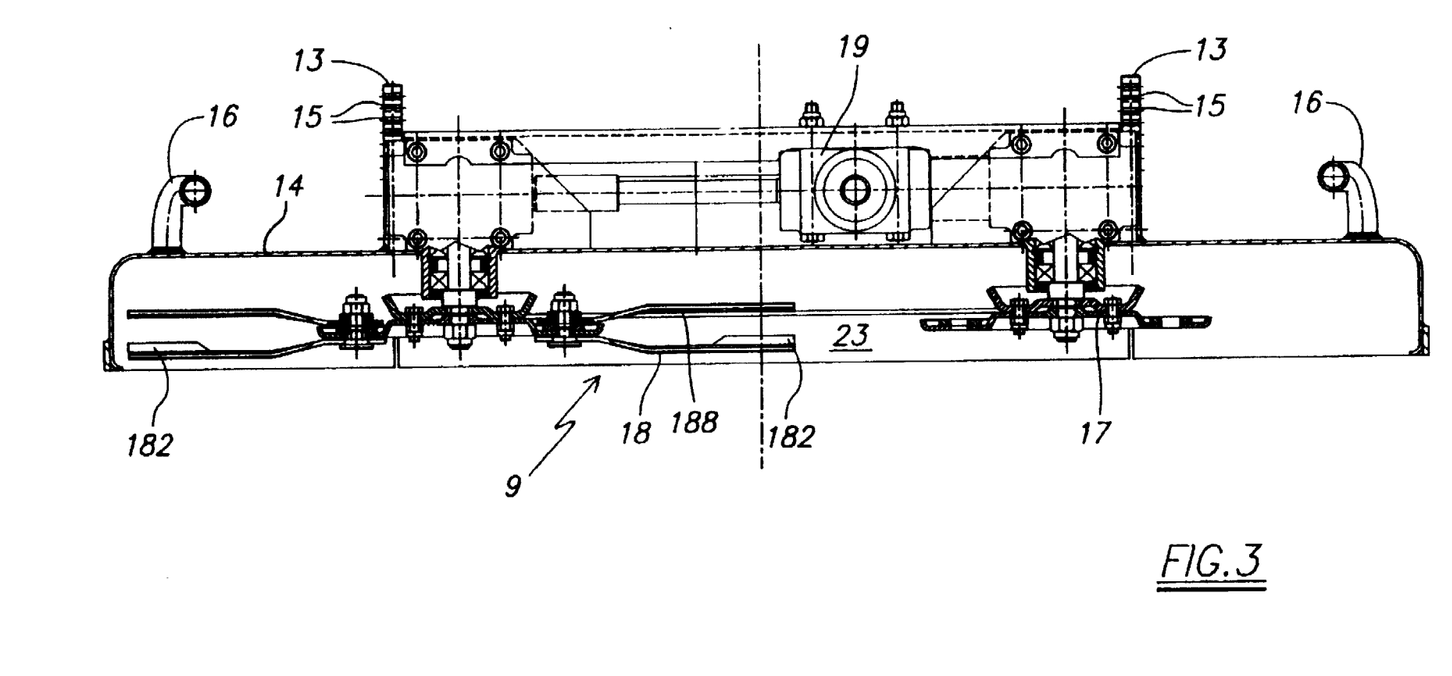
FIG. 3 is a section on the line III—III of FIG. 2.
Figure 4:
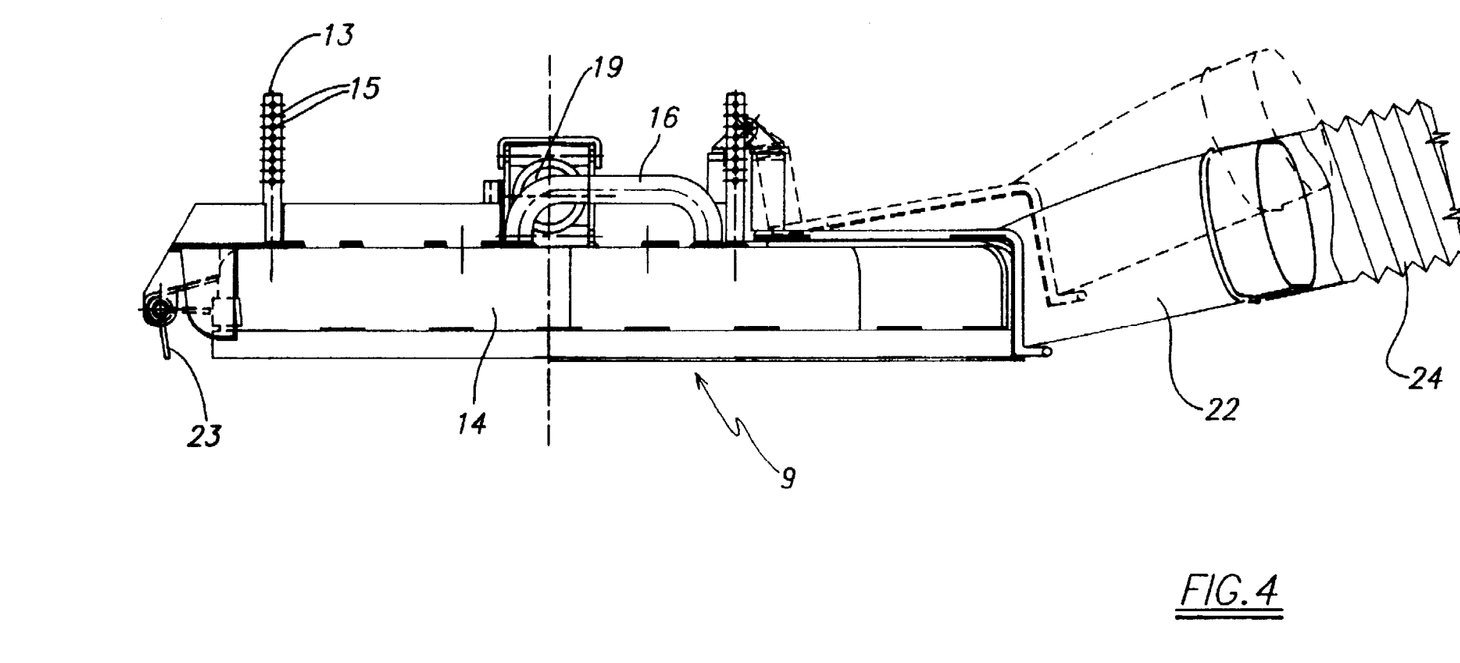
FIG. 4 is a section on the line IV—IV of FIG. 2.
Figure 6:
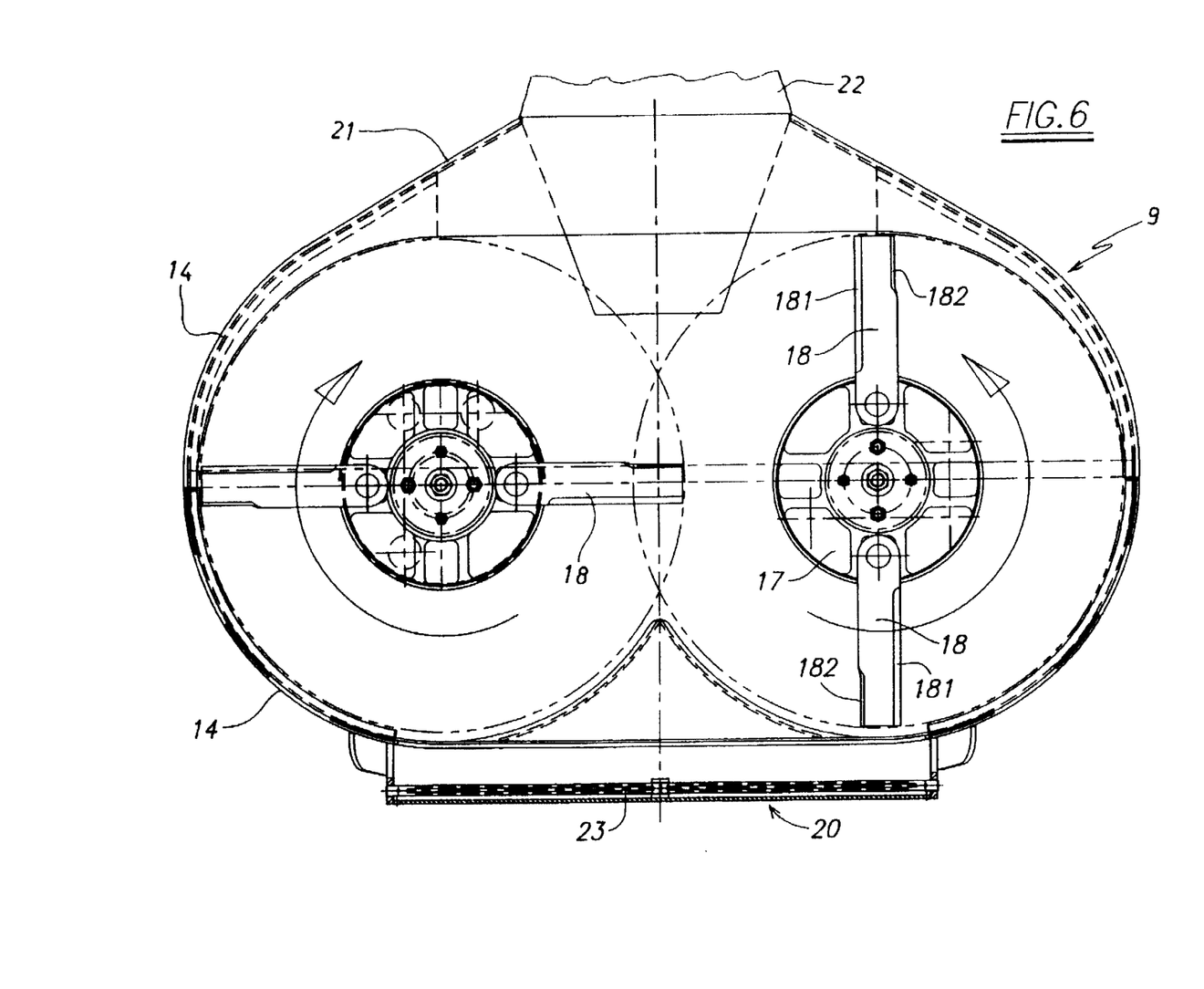
FIG. 6 is a view of the cutting unit taken from below.
Figure 7:
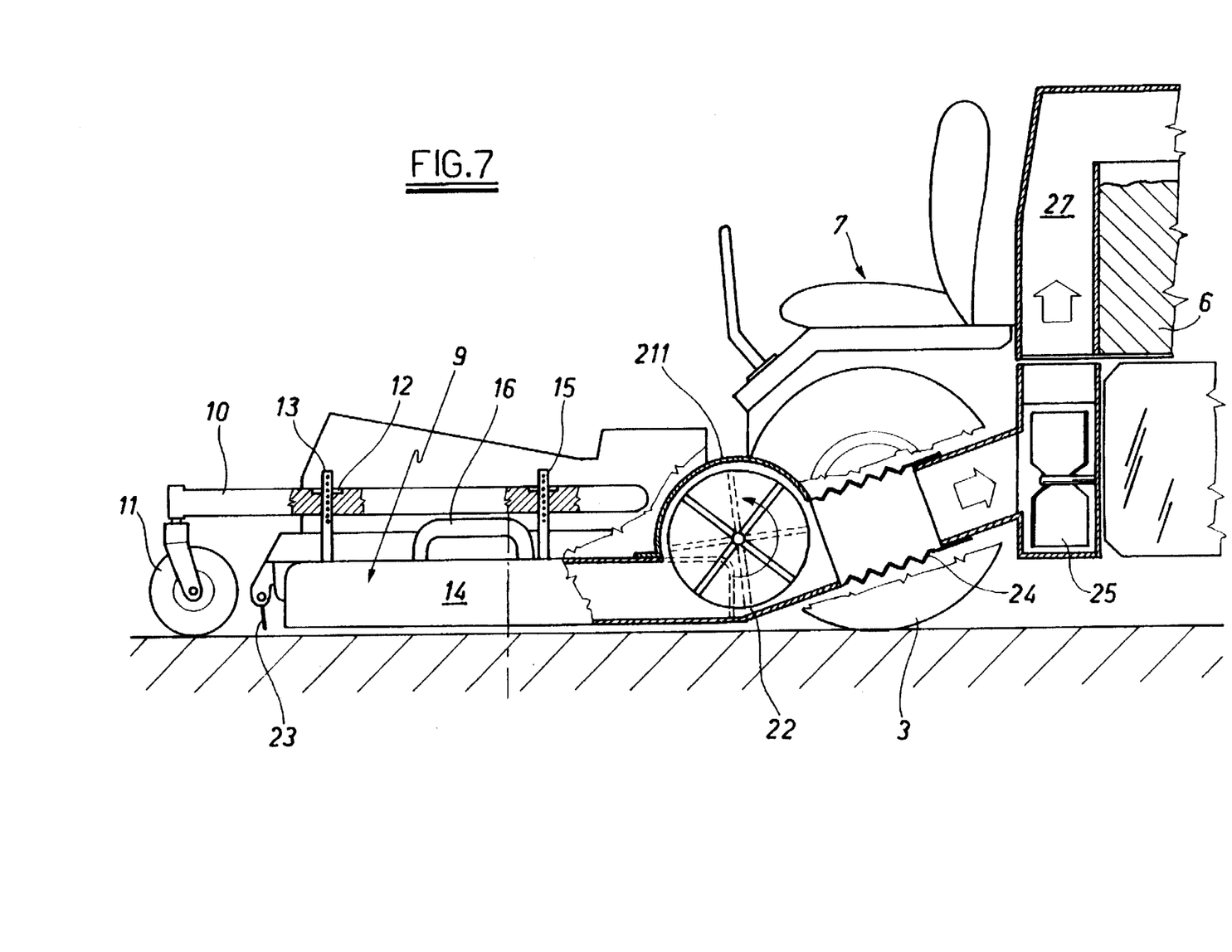
FIG. 7 shows a second embodiment of the invention in a view similar to FIG. 5.
Figure 8:
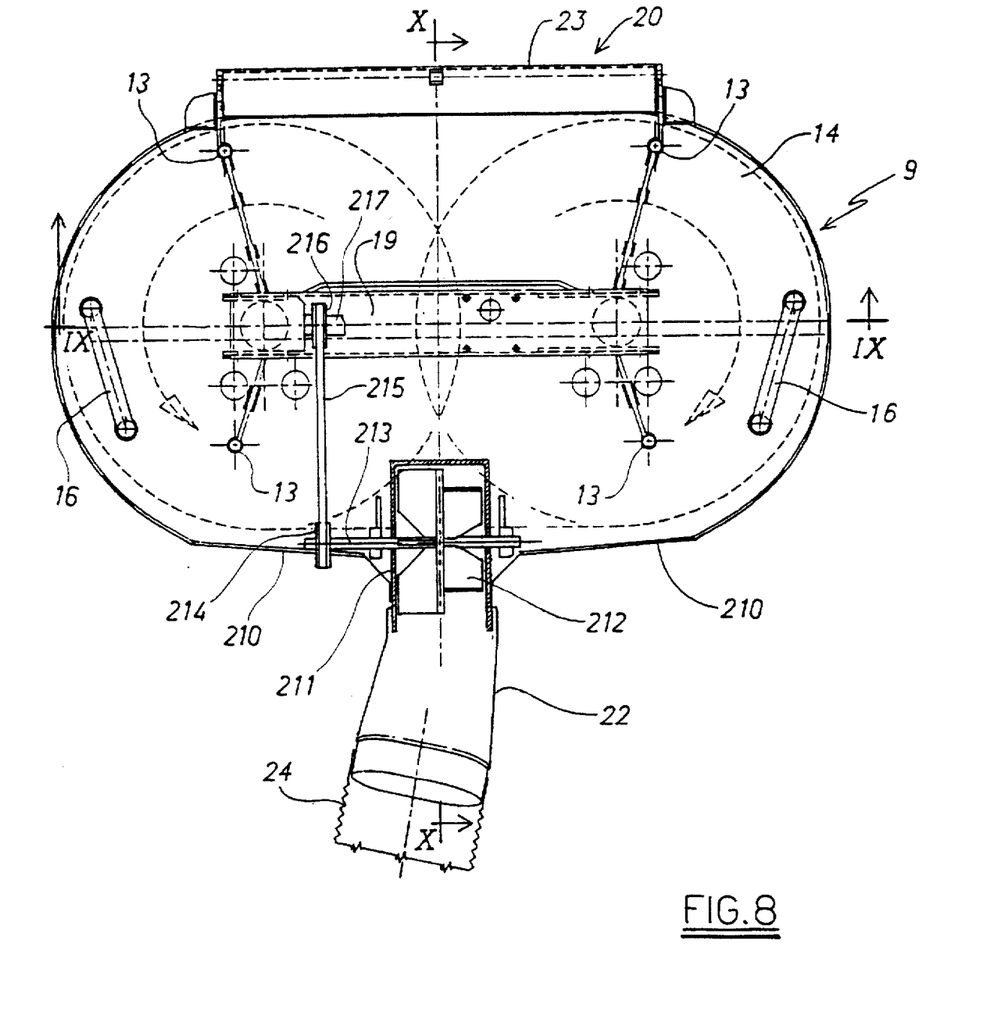
FIG. 8 is a view from above of the cutting unit of the second embodiment of the invention.
Figure 9:
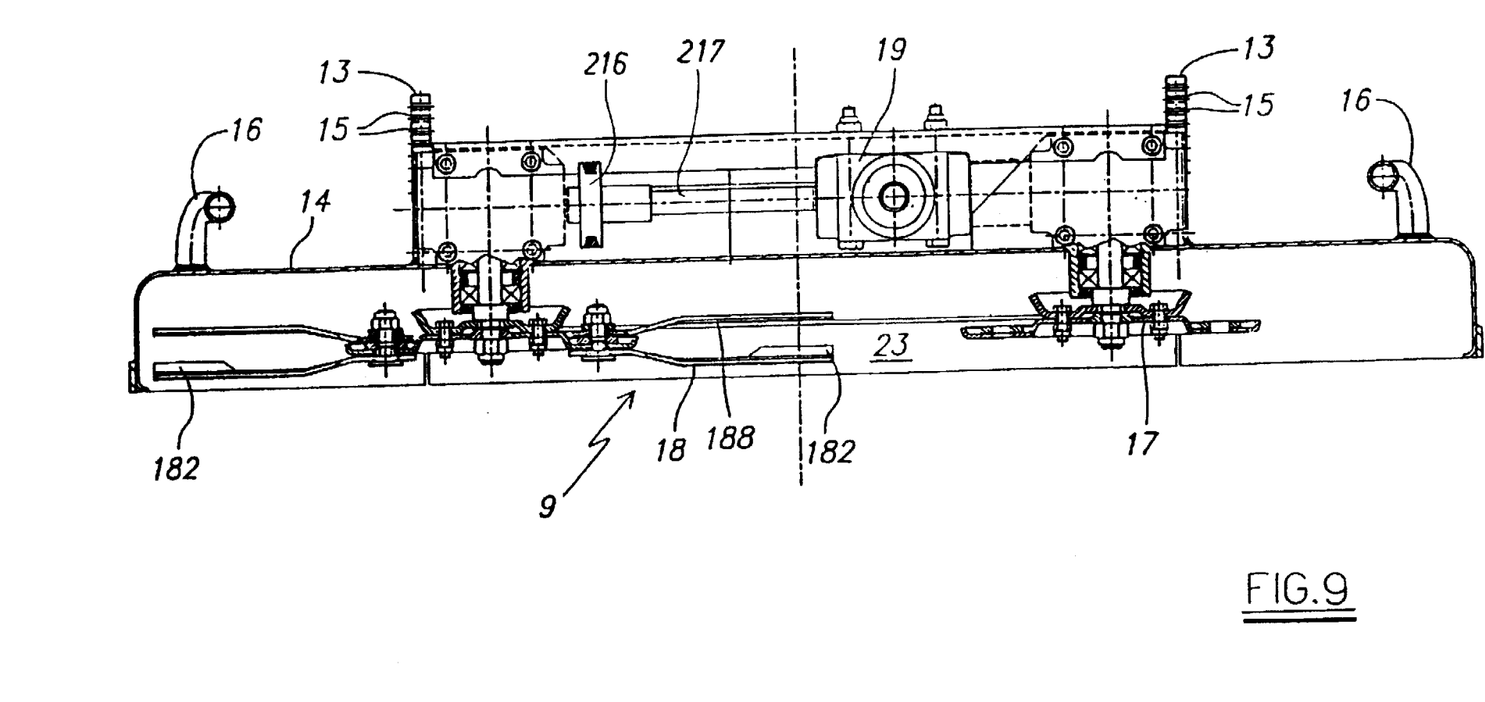
FIG. 9 is a section on the line IX—IX of FIG. 8.
Figure 10:
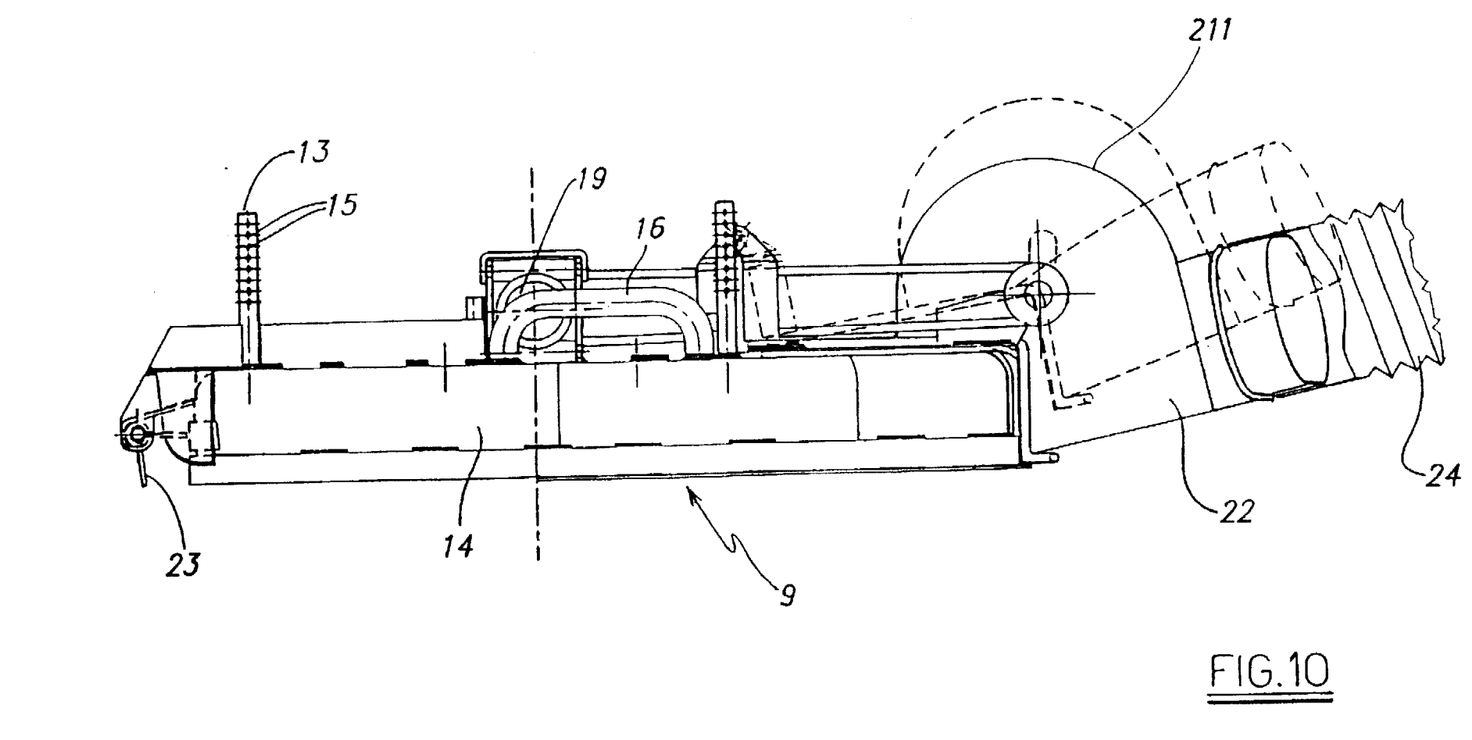
FIG. 10 is a section on the line X—X of FIG. 8.

The two rotors are connected to a single operating unit 19, of usual type, positioned above the casing 14.

The pair of blades of one rotor is offset by 90° from the pair of blades of the other rotor, the distance between the axes of rotation of the two rotors being such that the areas covered by the pairs of blades are partly superposed in correspondence with the longitudinal axis of the mower.

The two rotors move in opposite directions, their directions being such that the blades move in the same direction as the forward travel direction of the mower relative to a vantage point located in the superposed area of the cutting blades.

A counter-blade 188 overlies each blade 18, which comprises a cutting edge 181 and a fin 182 bent upwards to give the blade the behaviour of a fan blade.

A fin, not shown, analogous to the fin 182 but directed downwards, can be provided at the end of the counter-blade.

As can be seen from the figures, the casing 14 largely matches the area covered by the blades, it having a front edge 20 substantially perpendicular to the travel direction, and a rear edge 21 connected tangentially to the area covered by the blades and converging into an evacuation duct 22 for the cut grass.

According to the invention the central part of the front edge 20 is occupied by a door or flap 23 which is raised automatically towards the casing interior when particularly tall grass is cut.

The evacuation duct 22 is connected by a flexible pipe 24 to the suction duct of a fan 25 (FIG. 5) located on the main frame 2 of the mower.

Figure 5:
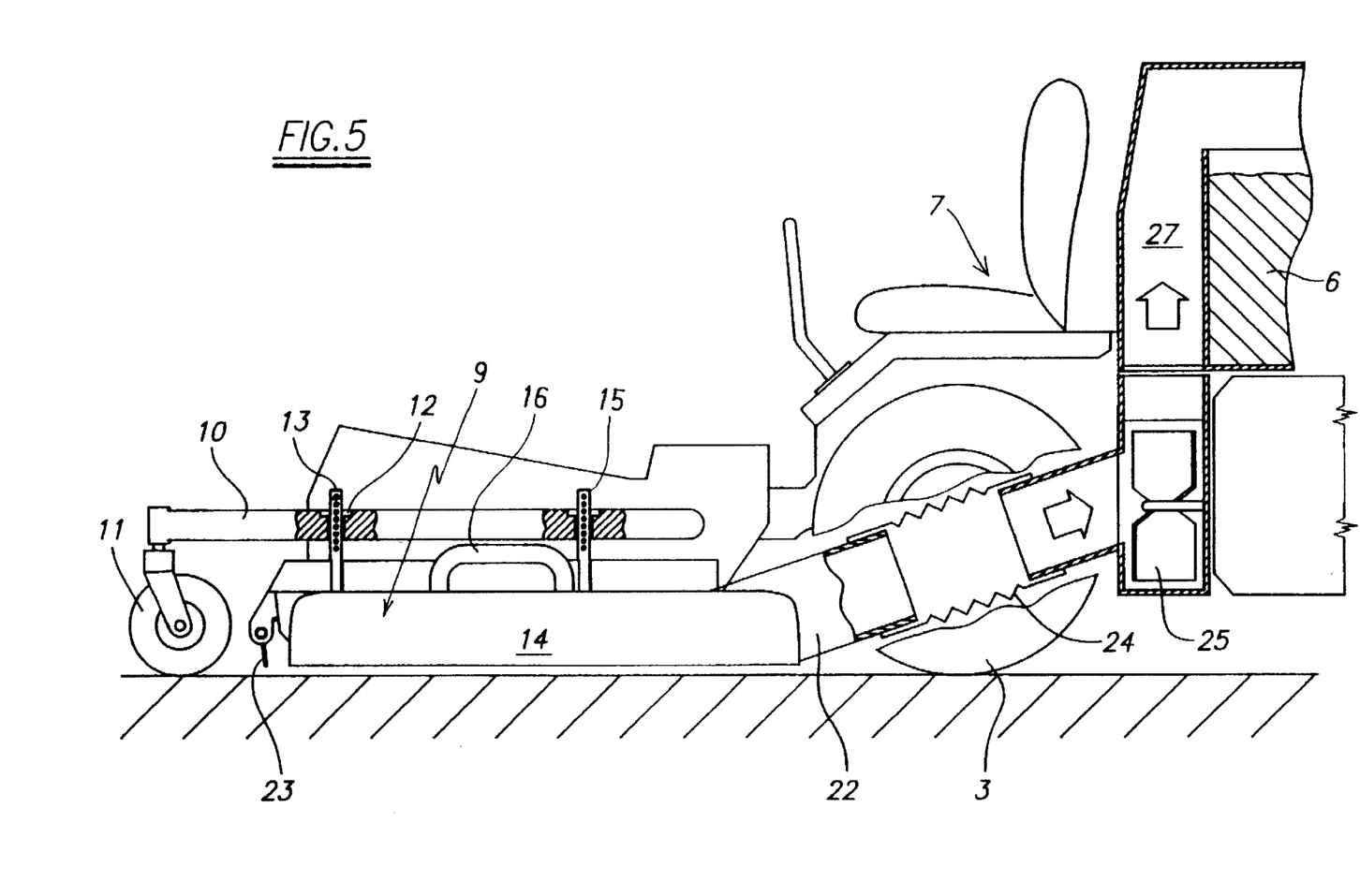
FIG. 5 is a partial schematic section through FIG. 1.

When the cut grass bin 6 is lowered, the delivery duct of the fan 25 opens into a vertical duct 27 rigid with the bin and conveying the cut grass into it.

FIGS. 7 to 10 show a second embodiment of the invention, in these latter figures the same reference numerals having been used for the same elements already shown in FIGS. 1 to 6.

In the second embodiment the rear edge 210 of the casing 14 is substantially perpendicular to the mower axis and converges at its center into a cowling 211 containing an impeller 212.

The axle 213 of the impeller carries a pulley 214 which is connected by a transmission belt 215 to the drive pulley 216 keyed onto the horizontal shaft 217 of the operating unit 19 for the rotors 17.

The impeller 212 is composed of two coaxial groups of four mutually perpendicular impeller blades, the blades of one group being offset by 45° from the blades of the other group.

At its rear the cowling 211 is connected to the evacuation duct 22.

I claim:

1. A cutting device of a lawn mower moving in a defined movement direction comprising:

a casing;

a first rotor and a second rotor coupled together within said casing, each rotor has a rotation axis spaced apart from each other;

a first set of aligned cutting blades and counter-blades rotates in a first direction, said first set is supported by said first rotor and provides a first mowing coverage area; and a second set of aligned cutting blades and counter-blades rotates in a second direction, said second set is supported by said second rotor and provides a second mowing coverage area, each counter-blade of each set is spaced between each cutting blade and each rotor of each set, each counter-blade has a predetermined shape to substantially reduce flow of cut grass towards said casing at locations adjacent to each rotor, said first and second mowing coverage areas overlap at a predetermined area within a center of said casing, the first direction is opposite to the second direction while each cutting blade and counter-blade rotates in the defined movement direction when each blade is within the predetermined area, whereby grass accumulations on said casing adjacent each rotor are substantially reduced.

2. The cutting device of claim 1, wherein each cutting blade includes a cutting edge and an upwardly bent fin for moving cut grass.

3. The cutting device of claim 1, wherein each counter-blade include a downwardly bent fin.

4. The cutting device of claim 1, wherein said casing covers the first and second mowing coverage areas and converges with a central duct which evacuates cut grass from said casing.

5. The cutting device of claim 1, further comprising:

a cowling;

an impeller disposed in said cowling and at a center of a rear edge of the casing enclosing the rotors which support the cutting blades, said impeller includes a rotational axis which is perpendicular to the defined movement direction; and an evacuation duct is connected to said cowling, said impeller propels cut crass into said evacuation duct.

6. The cutting device of claim 5, further comprising:

a belt transmission connected to said impeller;

a first axle connected to said first rotor;

a second axle connected to said second rotor; and a shaft connected to said first axle and said second axle, said belt transmission connects said impeller to said shaft.

7. The cutting device of claim 5, wherein said rear edge of said casing is substantially perpendicular to the defined movement direction.

* * * * *